United States Patent
Suzuki

(10) Patent No.: US 8,509,181 B2
(45) Date of Patent: Aug. 13, 2013

(54) WIRELESS COMMUNICATION APPARATUS AND COMMUNICATION METHOD THEREFOR

(75) Inventor: Motoharu Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 12/475,397

(22) Filed: May 29, 2009

(65) Prior Publication Data

US 2009/0310583 A1  Dec. 17, 2009

(30) Foreign Application Priority Data

Jun. 12, 2008 (JP) ................................. 2008-154593

(51) Int. Cl.
*H04W 4/00* (2009.01)
(52) U.S. Cl.
USPC ........... 370/331; 455/436; 455/437; 455/438; 455/443; 455/449
(58) Field of Classification Search
USPC ...................... 370/310–350; 455/422.11–460
See application file for complete search history.

(56) References Cited

U.S. PATENT DOCUMENTS

| | | | |
|---|---|---|---|
| 7,623,060 B1 * | 11/2009 | Chhabra et al. | 342/20 |
| 2004/0156336 A1 * | 8/2004 | McFarland et al. | 370/329 |
| 2005/0206554 A1 * | 9/2005 | Yamaura | 342/70 |
| 2005/0272435 A1 * | 12/2005 | Tsien et al. | 455/450 |
| 2006/0098592 A1 * | 5/2006 | Proctor, Jr. et al. | 370/315 |
| 2007/0032211 A1 * | 2/2007 | Kopikare et al. | 455/136 |
| 2007/0135057 A1 * | 6/2007 | Nallapureddy et al. | 455/67.13 |
| 2009/0316667 A1 * | 12/2009 | Hirsch et al. | 370/338 |

FOREIGN PATENT DOCUMENTS

| | | |
|---|---|---|
| JP | 2001-237847 | 8/2001 |
| JP | 2001-244851 | 9/2001 |
| JP | 2005-020162 | 1/2005 |

\* cited by examiner

*Primary Examiner* — Charles C Jiang

(74) *Attorney, Agent, or Firm* — Fitzpatrick, Cella, Harper & Scinto

(57) ABSTRACT

When a wireless communication apparatus capable of directly communicating with another communication apparatus performs communication via an access point, the wireless communication apparatus shares communication setting information with the other communication apparatus, the communication setting information being information for performing direct communication with the other communication apparatus without using that access point. If a radar signal is detected during communication with the other communication apparatus via the access point, switching to direct communication with the other communication apparatus is made based on the shared communication setting information.

22 Claims, 7 Drawing Sheets

WIRELESS COMMUNICATION APPARATUS AND COMMUNICATION METHOD THEREFOR

BACKGROUND OF THE INVENTION

1. Field of the Invention

The present invention relates to a wireless communication apparatus capable of directly communicating with another wireless communication apparatus and a communication method for the wireless communication apparatus.

2. Description of the Related Art

Transmission channels for data transfer include wireless transmission channels, and one common wireless transmission channel is a wireless LAN according to the IEEE 802.11 standard. The IEEE 802.11 standard defines two modes of wireless communication performed by wireless terminals. One mode is the infrastructure mode in which a plurality of wireless terminals communicates among themselves via an access point (AP) (also known as a base station). In this case, stations (STAs) connected to the base station communicate with each other under the control of the AP.

The other mode is the ad hoc mode, in which STAs directly communicate with each other without using a specific AP.

Moreover, wireless LAN standards include IEEE 802.11h as a supplementary specification for the MAC layer when operating a wireless LAN system using the 5 GHz frequency band. IEEE 802.11h specifies a function referred to as DFS (Dynamic Frequency Selection). The DFS function is a function for avoiding radio interference between a wireless LAN system using the 5 GHz band and a radar system using the same frequency band. Specifically, DFS includes a radar signal detection function and a function for stopping transmission of a signal on a frequency channel in use if a radar signal is detected.

As a technique related to the DFS function, Japanese Patent Laid-Open No. 2001-237847, for example, discloses a packet signal transmission device. The packet signal transmission device first measures the reception level of another system such as a radar system and compares the measured level with a threshold value preset in the packet signal transmission device. Then, depending on the result of the comparison, packet transmission is prohibited for a predetermined period of time. The abovementioned invention is a technique for prohibiting packet transmission in DFS and does not describe any technique for continuing communication by changing the frequency channel.

Meanwhile, Japanese Patent Laid-Open No. 2001-244851, for example, discloses a transmitting/receiving device for a frequency hopping communication method. According to this disclosure, when the transmitting/receiving device generates a hopping pattern that sequentially designates frequencies used for transmission/reception, the device stores an interfering frequency value of a frequency at which radio interference occurs, and uses the stored value afterward. Thus, in the case where there is a fixed interfering frequency, frequency hopping can be performed in such a manner that the interfering frequency is avoided.

The abovementioned invention is directed to a method for determining the frequency channel to be used subsequently when performing frequency hopping and does not contain detailed descriptions of procedures necessary to recreate a network.

Furthermore, Japanese Patent Laid-Open No. 2005-020162, for example, discloses a wireless communication apparatus that is applicable to a multihop wireless network in the ad hoc mode. In this disclosure, an STA that wishes to change the frequency channel sends a frequency channel change proposal containing the frequency channel to shift to and the time when the shift will take place by multihop transmission. Then, at the designated time of shift, all STAs simultaneously change the frequency channel. Thus, the frequency channel can be dynamically switched even in an ad hoc network.

However, radar systems are normally systems that may be used at any time. Moreover, IEEE 802.11h specifies that transmission should be stopped immediately after radar is detected.

Therefore, a method of simultaneously changing the frequency channel by time control, as with the abovementioned invention, is not suitable for the DFS function on a frequency channel where interference with a radar system may occur.

The following is a description of a common operation performed by an STA when interference with a radar system is detected in the case where the STA performs wireless communication in the infrastructure mode on a frequency channel where radio interference with a radar system may occur.

First, when an AP detects a radar signal, the AP stops wireless communication it is performing and recreates the network on a new frequency channel. An STA performing wireless communication via the AP detects the absence of the AP and searches for that AP. Specifically, the STA scans networks while successively switching frequency channels until the AP is found. When the STA finds the AP on the new frequency channel, the STA associates with the found AP. Thus, the STA can continue wireless communication via the AP with the frequency channel used being changed. That is to say, in the case where communication is performed in the infrastructure mode, if the DFS function of the AP operates properly, the communication network can be recreated on the changed frequency channel regardless of whether or not the STA is equipped with the DFS function.

Here, the case where the AP is not equipped with the DFS function or the case where the DFS function does not operate properly even though the AP is equipped therewith will be considered. In these cases, as long as the STA is equipped with the DFS function, the STA itself can stop transmission of a signal even when the AP does not detect radar interference.

However, in the case where the STA performs wireless communication with another STA via the same AP, the STA cannot resume communication with that other STA unless the AP recreates the network on the new frequency channel.

SUMMARY OF THE INVENTION

The present invention provides a wireless communication apparatus that can continue communication with another communication device in the case where a radar signal is detected during communication with the other communication device via a base station.

According to one aspect of the present invention, there is provided a wireless communication apparatus comprising: a sharing unit configured to share communication setting information with another communication apparatus, the communication setting information being information for performing direct communication with the other communication apparatus without using a base station; a detection unit configured to detect a radar signal; and a switching unit configured to switch to direct communication with the other communication apparatus based on the shared communication setting information in the case where a radar signal is detected during communication with the other communication apparatus via the base station.

According to another aspect of the present invention, there is provided a communication method for a wireless communication apparatus, the method comprising: sharing communication setting information with another communication apparatus, the communication setting information being information for performing direct communication with the other communication apparatus without using a base station; detecting a radar signal during communication with the other communication apparatus via the base station; and switching to direct communication with the other communication apparatus in the case where a radar signal is detected.

Further features of the present invention will become apparent from the following description of an exemplary embodiment with reference to the attached drawings.

DESCRIPTION OF THE EMBODIMENT

Hereinafter, the best mode for carrying out the invention will be described in detail with reference to the attached drawings.

An embodiment of the present invention will be described using IEEE 802.11 as an example of a wireless standard. However, it is to be understood that the applicable scope of the present invention is not limited only to this standard.

Figure 1:
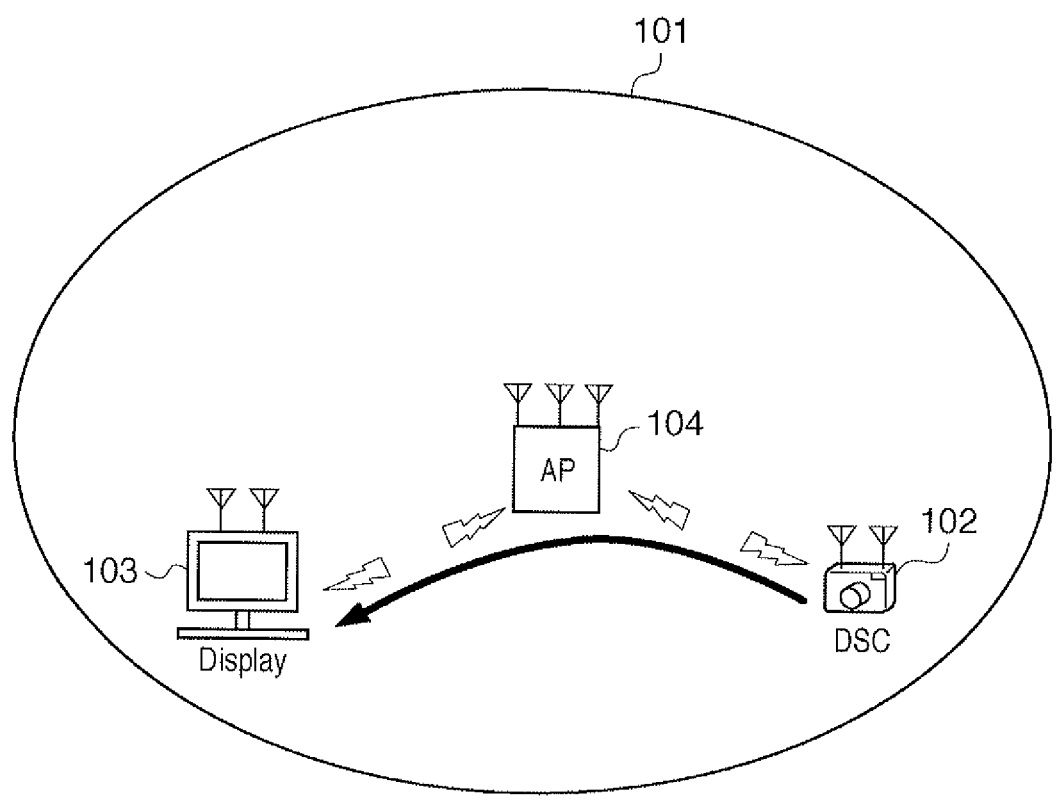
FIG. 1 is a diagram showing an example of a system to which a wireless communication device according to an embodiment of the present invention is applied.

FIG. 1 is a diagram showing an example of a system to which a wireless communication device according to the present embodiment is applied. In FIG. 1, a wireless communication system 101 is constructed in the infrastructure mode according to the IEEE 802.11a standard. A plurality of wireless terminals belongs to this system. Moreover, it is assumed that the communication channel (frequency channel) currently in use is a communication channel on which interference with a radar system may occur.

A digital still camera (DSC) 102 and a display 103 can operate in both the infrastructure mode and the ad hoc mode according to the IEEE 802.11a standard. Moreover, it is assumed that the DSC 102 and the display 103 also support the IEEE 802.11h standard.

An access point (AP) 104 has a function of transmitting, wirelessly or over wires, data that has been received wirelessly or over wires from one device to another device. Here, the AP 104 operates as a base station that has created a network in the infrastructure mode according to the IEEE 802.11a standard. In contrast, the DSC 102 and the display 103 operate as stations (STAs) under the control of the AP 104.

A possible use of the system shown in FIG. 1 is, for example, to output still picture data saved in the DSC 102 to the display 103.

In the present embodiment, a method of addressing a situation where the DSC 102 or the display 103 detects a radar signal while the DSC 102 and the display 103 communicate wirelessly with each other via the AP 104 will be described. Specifically, this is a method for allowing the DSC 102 and the display 103 to continue to communicate with each other even in cases such as where a radar signal enters the network but the AP 104 does not recreate the network on a new communication channel for reasons such as that the AP 104 cannot detect the radar signal. That is to say, this is a method in which the STAs automatically change the communication channel and switch to the ad hoc mode to communicate with each other.

Here, the internal configurations of the DSC 102 and the display 103, which function as wireless communication devices, will be described using FIGS. 2 to 4.

Figure 2:
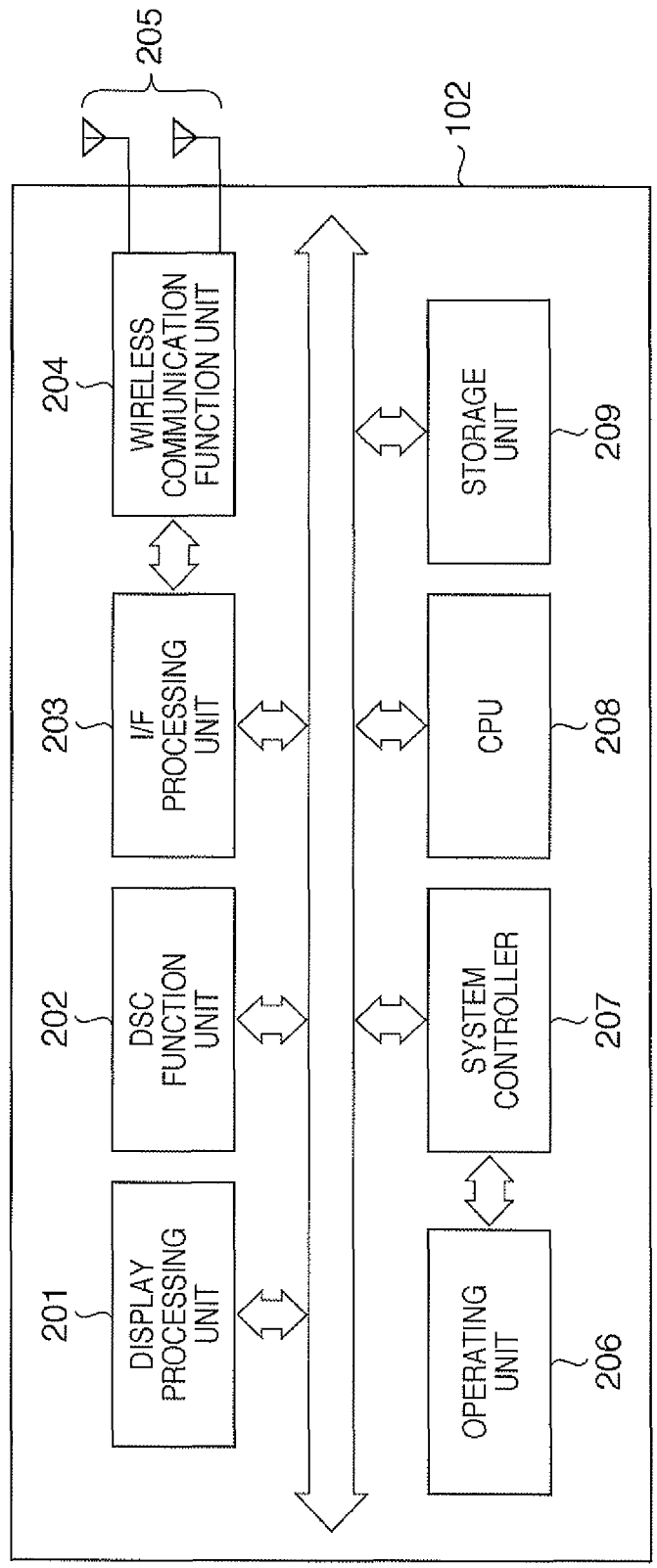
FIG. 2 is a block diagram showing an example of the configuration of a digital still camera (DSC) according to the present embodiment.
Figure 3:
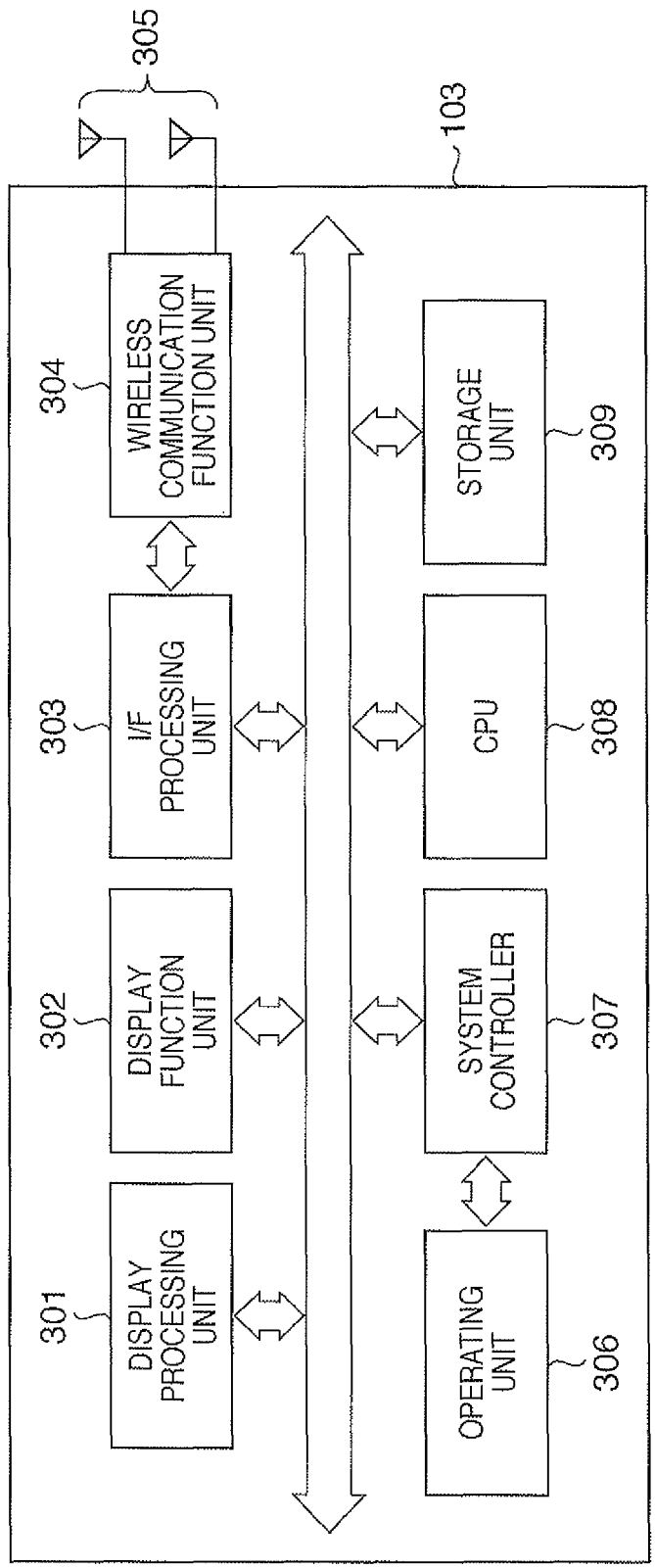
FIG. 3 is a block diagram showing an example of the configuration of a display according to the present embodiment.

FIG. 2 is a block diagram showing an example of the configuration of the digital still camera (DSC) according to the present embodiment. A display processing unit 201 controls items to be displayed to a user, through, for example, LCD display, LED display, audio display, or the like, and displays the items as information. A DSC function unit 202 is a function unit for realizing the function of a DSC and, for example, actually picks up an image. An I/F processing unit 203 performs processing in compliance with a protocol used by an interface that performs data communication between a control unit configured of a CPU 208 or the like and a wireless communication function unit 204.

The wireless communication function unit 204 performs wireless communication in compliance with the IEEE 802.11a standard and IEEE 802.11h, which is an extension of the IEEE 802.11a standard. Antennas 205 transmit/receive wireless signals.

An operating unit 206 is connected to the CPU 208 via a system controller 207. The display processing unit 201 and the operating unit 206 serve as a user interface of the DSC 102. These functional parts are processed under the control of the CPU 208. A program to be executed by the CPU 208 is stored in a storage unit 209 configured of a RAM, a flash ROM, or the like. Moreover, data to be processed by the CPU 208 is also stored in the storage unit 209.

Next, the internal configuration of the display 103 will be described using FIG. 3. FIG. 3 is a block diagram showing an example of the configuration of the display according to the present embodiment. Note that components 301 and 303 to 309 of the display 103 respectively correspond to the components 201 and 203 to 209 of the DSC 102, and thus descriptions thereof will be omitted. A display function unit 302 realizes the function of a display.

Next, the internal configuration of the wireless communication function unit 204 or 304 of the DSC 102 or display 103 will be described using FIG. 4. In the following description, it is assumed that FIG. 4 shows the wireless communication function unit 204 of the DSC 102.

Figure 4:
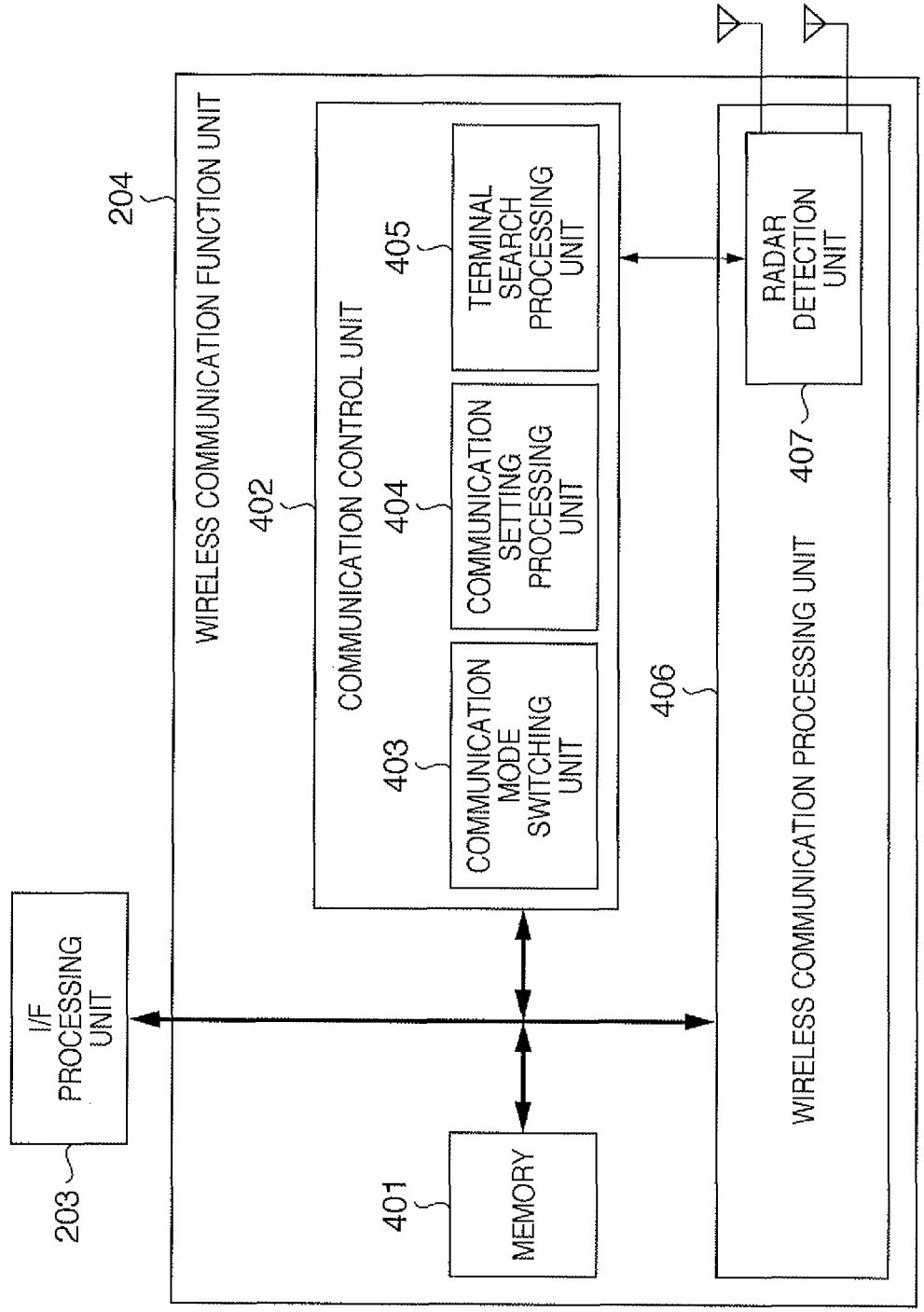
FIG. 4 is a block diagram showing an example of the configuration of a wireless communication function unit according to the present embodiment.

FIG. 4 is a block diagram showing an example of the configuration of the wireless communication function unit according to the present embodiment. A memory 401 shown in FIG. 4 temporarily stores data to be transmitted from a wireless communication processing unit 406 and data received by the wireless communication processing unit 406. A communication control unit 402 conducts the overall control of the wireless communication processing unit 406.

Here, characteristic functions of the communication control unit 402 will be described. A communication mode switching unit 403 determines whether the infrastructure mode or the ad hoc mode is to be used based on instructions from the CPU 208 or autonomous determination from the communication control unit 402. A communication setting processing unit 404 manages communication setting information in the infrastructure mode and the ad hoc mode. Specifically, the communication setting processing unit 404 reflects the communication setting information in the wireless communication processing unit 406 or notifying another device of the communication setting information. Although a detailed description will be provided later herein, the communication setting information includes a communication channel, a network identifier (BSSID), an encryption key, an encryption method, and the like.

A terminal search processing unit 405 searches for another wireless communication device. This unit has two searching methods. One method is a method in which the terminal search processing unit 405 performs a search by receiving and analyzing a beacon signal or the like transmitted from another device without transmitting its own search signal (a probe request) (passive scanning). The other method is a method in which the terminal search processing unit 405 performs a search by transmitting its own search signal, waiting for a response (a probe response) from a device being searched for, and receiving and analyzing the signal provided as the response (active scanning).

The wireless communication processing unit 406 encodes and modulates a communication frame stored in the memory 401 and transmits the frame from the antennas 205. Moreover, the wireless communication processing unit 406 demodulates and decodes data received from the antennas 205 and stores the data in the memory 401.

The wireless communication processing unit 406 includes a radar detection unit 407. In the case where the radar detection unit 407 detects a radio wave stronger than the signal strength of wireless LANs, for example, a radar signal, while receiving radio waves, the radar detection unit 407 notifies the communication control unit 402.

Assuming the foregoing configuration, a process for shifting to the ad hoc mode in the case where a radar signal is detected while the DSC 102 and the display 103 wirelessly communicate with each other via the AP 104 will be described using FIGS. 5 and 6.

Figure 5:
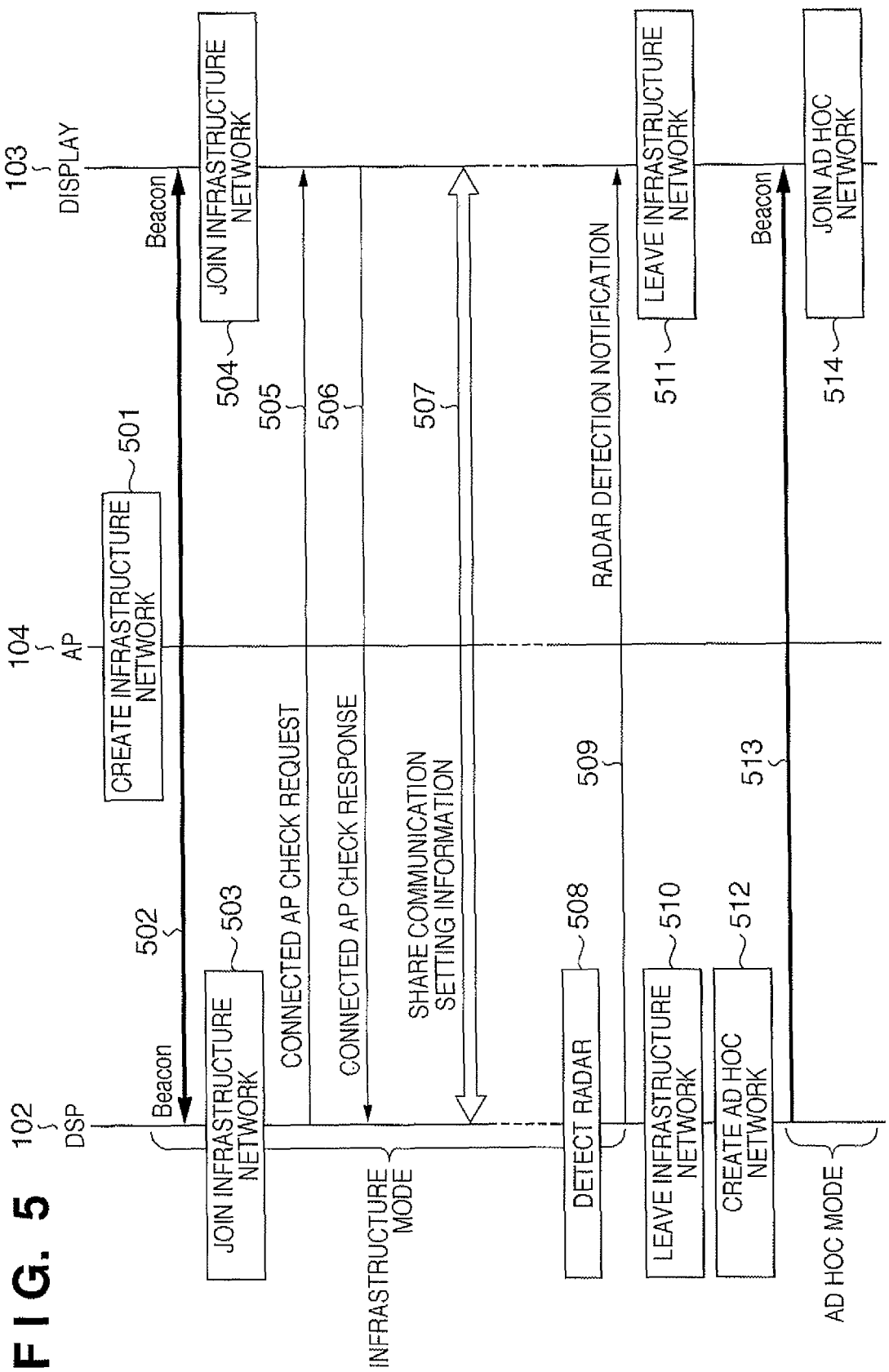
FIG. 5 is a diagram showing a sequence of the wireless communication system according to the present embodiment.
Figure 6:
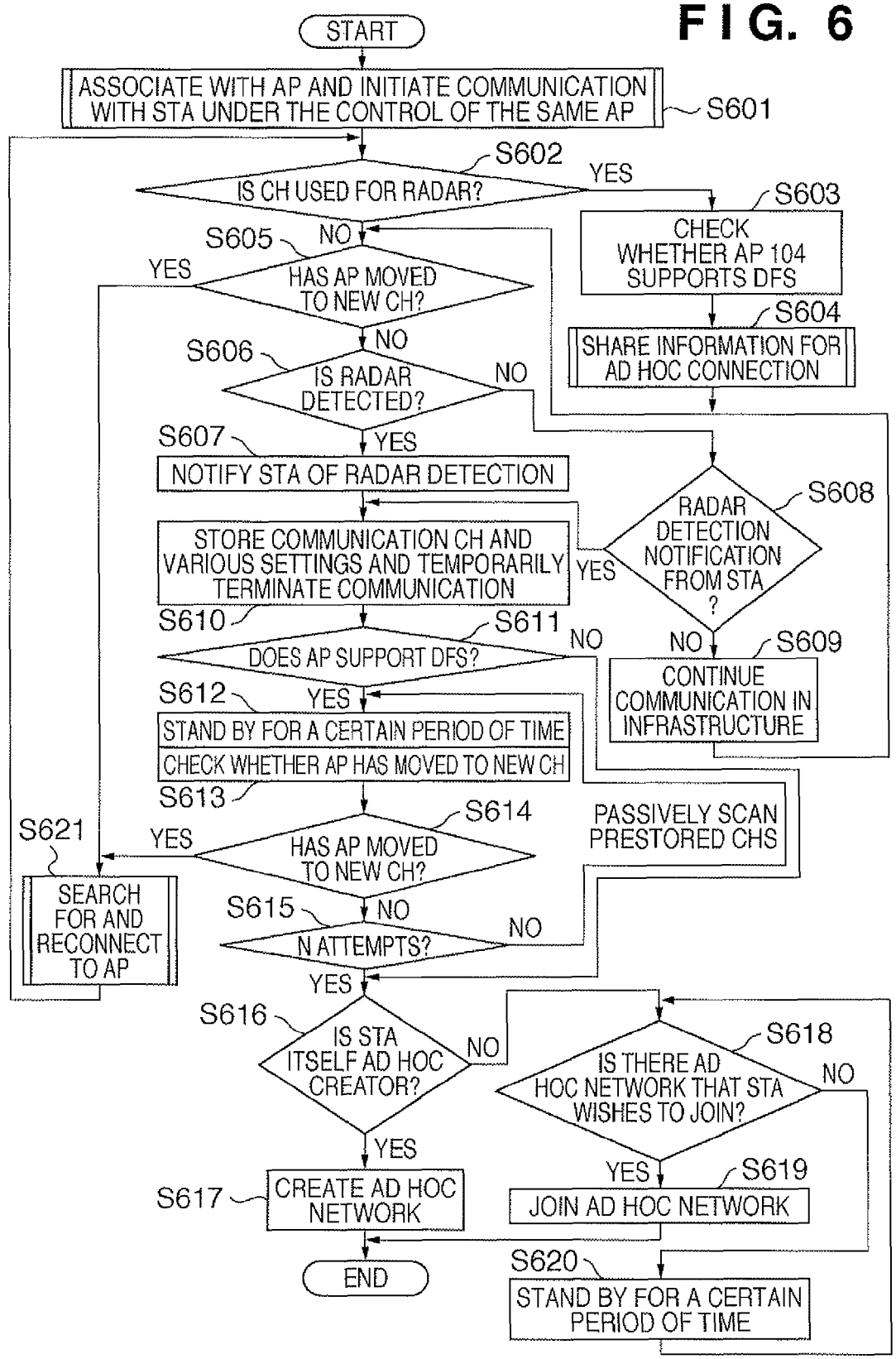
FIG. 6 is a flowchart showing processing performed by the DSC 102 and the display 103.

FIG. 5 is a diagram showing a sequence of the wireless communication system according to the present embodiment. FIG. 6 is a flowchart showing processing performed by the DSC 102 and the display 103.

First, the AP 104 creates a network in the infrastructure mode (501). Next, the DSC 102 and the display 103 seek the network to join based on a beacon signal (502) transmitted from the AP 104 and join that network (503 and 504). Then, the DSC 102 and the display 103 start to communicate with each other in the infrastructure mode (S601).

Subsequently, the DSC 102 or the display 103 checks whether or not the other device is wirelessly connected to the same AP as the AP the DSC 102 or the display 103 itself is connected to. In the present embodiment, it is assumed that the DSC 102 initiates a check process with the display 103.

First, the DSC 102 transmits a connected AP check request signal to the display 103 (505), and in response to this, the display 103 transmits a connected AP check response signal to the DSC 102 (506). As another method, the DSC 102 may transmit a signal to the display 103 notifying the display 103 of the AP that the DSC 102 is connected to. Moreover, as for the time at which the signal is transmitted, it is good to use a method in which after the DSC 102 or the display 103 has confirmed that it has established a connection with the AP 104, the DSC 102 and the display 103 mutually defer processing for a random amount of time, and the device for which the random amount of time has elapsed first transmits a signal.

Thus, the problem that both the DSC 102 and the display 103 transmit a signal at the same time can be avoided. If it is found by performing this procedure that the DSC 102 and the display 103 are not connected to the same AP, the DSC 102 and the display 103 do not create the same ad hoc network.

Next, the DSC 102 and the display 103 determine whether or not a communication channel being used for the current wireless communication in the infrastructure mode is a communication channel on which interference with a radar system may occur (S602). In other words, it is determined whether or not the communication channel being used for wireless communication via the AP 104 is a communication channel used for transmission of radar signals. To use Japan as an example, use of the IEEE 802.11a standard is permitted in four major frequency ranges, or J52/W52/W53/W56, and of these, W53/W56 are the frequency ranges that are used also for radar systems.

For this reason, in Japan, setting whether or not W53/W56 are used as a specific criterion for determination is an effective method.

If the result of the determination indicates that a communication channel on which interference may occur is being used (YES in S602), the DSC 102 and the display 103 perform the following two operations.

The first operation is to examine whether or not the AP 104 supports DFS (S603). In other words, it is determined whether or not the AP 104 supports the IEEE 802.11h standard. This can be easily determined by, for example, analyzing whether or not the AP 104 transmits a signal having a MAC frame according to the IEEE 802.11h standard.

The second operation is to perform a process for sharing various types of communication setting information to be used when the DSC 102 and the display 103 create an ad hoc network (507 and S604). Specifically, a network identifier (BSSID) of the ad hoc network is shared as the communication setting information. Moreover, a communication channel on which the ad hoc network is to be created may be determined in advance. Once again, to use Japan as an example, it is the rule that the frequency range where an ad hoc network can be created according to the IEEE 802.11h standard is either J52 or W52, and thus an appropriate channel is determined from the frequency bands of J52 or W52.

If the DSC 102 and the display 103 support also the IEEE 802.11b/g standards in terms of their wireless functionality, a communication channel in the 2.4 GHz band can also be used. When desiring to use the 2.4 GHz band as a communication channel, it is good to determine in advance which of the IEEE 802.11b/g is used to create an ad hoc network.

Moreover, information about security, such as an encryption key and an encryption method, may also be shared as the communication setting information. Furthermore, information on which of the creating side (a creator) or the joining side (a joiner) of the ad hoc network the DSC 102 and the display 103 act as may also be shared as the communication setting information. In addition, various setting items, such as the transmission rate, that are to be changed from those in the infrastructure mode may also be determined at the time when the communication setting information is shared. By sharing the various types of communication setting information beforehand, communication can be initiated immediately after switching to the ad hoc network by a process described later. Note that in the above-described sharing process, either the DSC 102 or the display 103 may determine communication setting information and notify the other device, or the DSC 102 and the display 103 may mutually generate common communication setting information using a predefined algorithm.

When sharing of various types of setting information for the ad hoc network is completed, the DSC 102 and the display 103 continue data transmission of user data and the like in the ordinary infrastructure mode (S609). However, if it is detected that the AP 104 has moved to a new communication channel (YES in S605), these devices search for and reconnect to the AP (S621).

During communication in which the DSC 102 and the display 103 perform data transmission of user data and the like in the infrastructure mode, the DSC 102 and the display 103 shift to a process for stopping the infrastructure mode under the following conditions.

First, if the DSC 102 or the display 103 detects a radar signal (508 and YES in step S606), this device notifies the other device that it has detected radar (509 and S607). Thus, even if the other device has not yet detected radar, communication in the infrastructure mode can be terminated immediately.

Moreover, also if the DSC 102 or the display 103 receives a radar detection notification from the other device, the DSC 102 or the display 103 discontinues communication in the infrastructure mode. When discontinuing the communication, the DSC 102 or the display 103 saves the communication setting information up to this point in time and terminates the communication (510 and 511, and S610). Thus, even in the case where, for example, the AP 104 has moved to a new communication channel and recreated the network, the DSC 102 and the display 103 can join the recreated network immediately.

After termination of the communication in the infrastructure mode, it is determined whether or not the AP 104 supports DFS (S611) by referring to the check result in S603. Depending on the result of this determination, the DSC 102 and the display 103 operate as follows.

If the AP 104 does not support DFS (NO in S611), the AP 104 will not actively change the communication channel. That is to say, even when the DSC 102 and the display 103 wait for the AP 104 to recreate the infrastructure network on a new communication channel, the possibility of such a network being established is low. Accordingly, in this case, the DSC 102 and the display 103 immediately advance to a procedure for creating/joining an ad hoc network (S616).

However, if the AP 104 supports DFS (YES in S611), the DSC 102 and the display 103 stand by for a certain period of time (S612). The reason for this is that in this case, since the AP 104 supports DFS, there is a possibility of the AP 104 detecting a radar signal, changing to a new communication channel, and recreating the infrastructure network.

After standing by for the certain period of time, the DSC 102 and the display 103 check whether the AP 104 has changed to a new communication channel (S613). Although there are various check methods, the DSC 102 and the display 103 may check by, for example, scanning all communication channels except for the communication channel that the DSC 102 and the display 103 have heretofore used to communicate with the AP.

Note that in the case where there is a communication channel where sending radio waves is prohibited for regulatory or other reasons, it is necessary to use passive scanning.

Moreover, whether or not the AP 104 has changed to a new communication channel may be checked by periodically performing a passive scan of the communication channel originally used for the connection to the AP 104 in the infrastructure mode.

If the result of the check indicates that the AP 104 has changed to a new communication channel (YES in S614), the DSC 102 and the display 103 search for the AP 104 and perform a reconnecting process when the AP 104 is found (S621).

On the other hand, if the result of the check indicates that the AP 104 has not changed to a new communication channel (NO in S614), the DSC 102 and the display 103 perform the process for checking whether or not the AP 104 has changed the communication channel for a certain period of time and/or a certain number of times. Then, if it cannot be confirmed that the AP 104 has changed the communication channel (YES in S615), the DSC 102 and the display 103 advance to the procedure for creating/joining the ad hoc network (S616).

In a process for performing direct communication using the ad hoc mode, if the DSC 102 or the display 103 is the creator of the ad hoc network (YES in S616), that device creates the ad hoc network (512 and S617). Specifically, the device creates the network by initiating transmission of a beacon using a network identifier that is determined in advanced when sharing the communication setting information. The device that is the joiner can detect the created network by using the network identifier that has been shared beforehand. Note that in the case where a communication channel to be used by the ad hoc network also has been shared, the network is created using that communication channel. Thus, the device that is the joiner can detect a beacon transmitted by the device that is the creator without scanning a plurality of communication channels.

On the other hand, if the DSC 102 or the display 103 is the joiner of the ad hoc network (NO in S616), the device searches for the network based on a beacon (513) transmitted by the creator (S618). In the search process, the device scans for the presence of the network to join by monitoring the beacon based on the communication setting information that has been shared beforehand. Note that the network may also be searched for by active scanning instead of passive scanning, or both passive scanning and active scanning may be used. If the search results in the detection of the network to join, the device joins that network (514 and S619).

Here, it can be determined in advance in the prior sharing process whether the DSC 102 or the display 103 acts as the creator of the network (507 and S604). If not determined in advance, the DSC 102 and the display 103 mutually stand by for a random amount of time (S620), and the device for which the random amount of time has elapsed first acts as the creator and creates the network.

The ad hoc network can be created by the above-described procedure, and thus the DSC 102 and the display 103 can continue to communicate with each other. Although the present embodiment was described using the IEEE 802.11a standard as an example, the present invention is also applicable to IEEE 802.11n, which is a standard currently under development.

Moreover, although the case where the number of STAs is two was described, the present invention is also applicable to the case where the number of STAs is three or more. Here, the case where a digital video camera (DV) newly enters the system shown in FIG. 1 will be described as an example.

Figure 7:
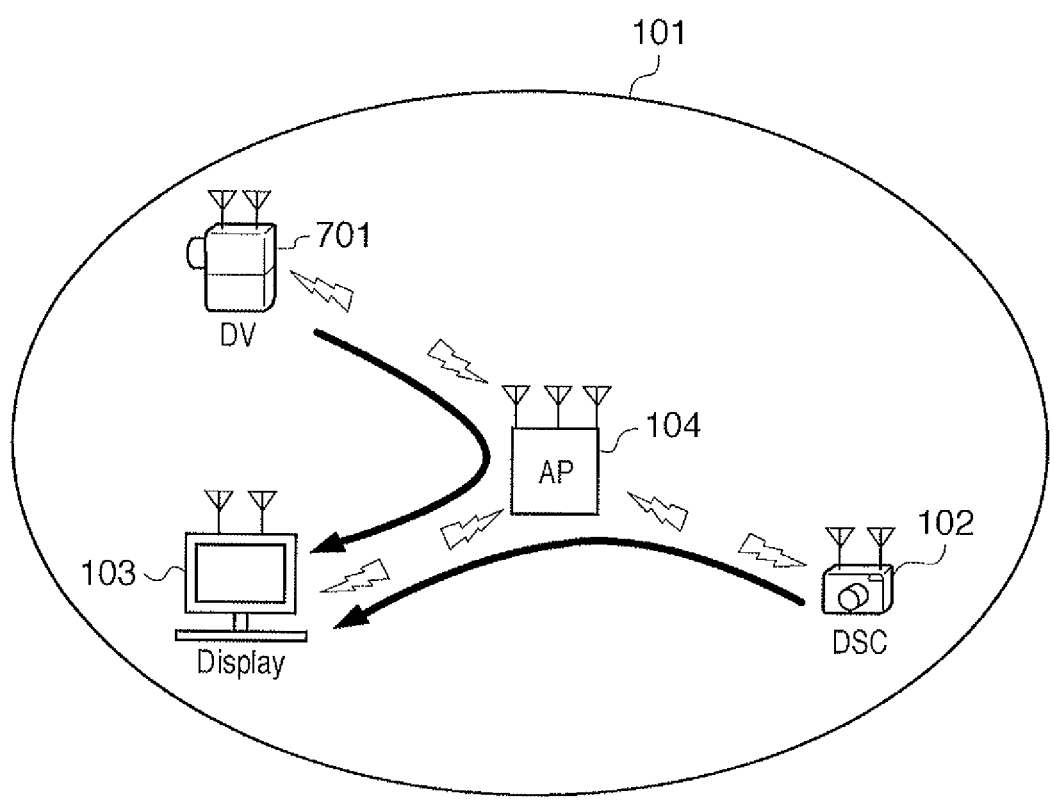
FIG. 7 is a diagram illustrating a variation of the present embodiment.

FIG. 7 is a diagram illustrating a variation of the present embodiment. Here, it is assumed that the DSC 102 and the display 103 have already shared communication setting information for creating an ad hoc network by performing the relevant procedure (507 and S604).

When a DV 701 requests the DSC 102 or the display 103 to share the communication setting information for creating the ad hoc network, the requested device notifies the DV 701 of the shared communication setting information. Thus, the DV 701 also can join the ad hoc network.

Note that the present invention may be applied to a system constituted by a plurality of devices (e.g., a host computer, an interface device, a reader, and a printer) or may be applied to an apparatus (e.g., a copier or a facsimile machine) consisting of a single device.

Moreover, a recording medium on which is recorded a program code of software that realizes the function of the above-described embodiment is supplied to a system or an apparatus, and a computer (a CPU or an MPU) of the system or the apparatus reads out and executes the program code stored on the recording medium. It goes without saying that the object of the present invention is also achieved in this manner.

In this case, the program code read out from the computer-readable recording medium, in itself, realizes the function of the above-described embodiment, so the recording medium storing the program code constitutes the present invention.

For example, a flexible disk, a hard disk, an optical disk, a magneto-optical disk, a CD-ROM, a CD-R, a magnetic tape, a nonvolatile memory card, and a ROM can be used as the recording medium for supplying the program code.

Moreover, it goes without saying that the function of the above-described embodiment is realized not only by the computer executing the read-out program code, and the present invention also covers the following case. That is to say, the present invention also covers the case where an OS (operating system) or the like running on the computer executes actual processing in part or in whole based on an instruction of the program code, and the function of the above-described embodiment is realized by the processing.

Furthermore, the program code read out from the recording medium is written into a memory provided in a function expansion board inserted in the computer or a function expansion unit connected to the computer. Then, a CPU or the like provided in the function expansion board or the function expansion unit executes actual processing in part or in whole, and the function of the above-described embodiment is realized by the processing. It goes without saying that this case also is covered by the present invention.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-154593, filed Jun. 12, 2008, which is hereby incorporated by reference herein in its entirety.

What is claimed is:

1. A wireless communication apparatus comprising:
a computer-readable memory constructed to store computer-executable instructions implementing process steps; and
at least one processor constructed to execute the computer-executable instructions stored in the memory,
wherein the process steps implemented by the instructions stored in the memory comprise:
sharing communication setting information with another communication apparatus, the communication setting information being information for performing direct communication with the other communication apparatus without using a base station;
detecting a radar signal; and
switching to direct communication with the other communication apparatus based on the shared communication setting information in the case where a radar signal is detected during communication with the other communication apparatus via the base station.

2. The apparatus according to claim 1, wherein a process for sharing the communication setting information is performed in the case where a frequency channel used for communication with the other communication apparatus via the base station is a frequency channel used for transmission of a radar signal.

3. The apparatus according to claim 1, wherein the process steps further comprise determining whether or not the base station has a function of changing the frequency channel upon receipt of a radar signal, and
wherein switching to direct communication with the other communication apparatus is performed in the case where it is determined that the base station does not have the function of changing the frequency channel upon receipt of a radar signal.

4. The apparatus according to claim 1, wherein the process steps further comprise determining whether or not the base station has created a network on another frequency channel in the case where a radar signal is detected, and
wherein switching to direct communication with the other communication apparatus is performed in the case where it is determined that the base station has not created a network on another communication channel.

5. The apparatus according to claim 1, wherein the communication setting information contains an identifier of a network on which the direct communication is performed.

6. The apparatus according to claim 5, wherein the communication setting information further contains a frequency channel that is used during the direct communication.

7. The apparatus according to claim 5, wherein the communication setting information further contains information that indicates a creator or a joiner of the network on which the direct communication is performed.

8. The apparatus according to claim 1, wherein the process steps further comprise notifying the other communication apparatus of the detection of a radar signal in the case where a radar signal has been detected.

9. The apparatus according to claim 1, wherein switching to direct communication with the other communication apparatus is performed by changing the communication mode from an infrastructure mode to an ad hoc mode.

10. A non-transitory computer-readable recording medium on which are recorded computer-executable instructions for causing a computer to function as the wireless communication apparatus according to claim 1.

11. A communication method for a wireless communication apparatus, the method comprising:
sharing communication setting information with another communication apparatus, the communication setting information being information for performing direct communication with the other communication apparatus without using a base station;
detecting a radar signal during communication with the other communication apparatus via the base station; and
switching to direct communication with the other communication apparatus in the case where a radar signal is detected.

12. A wireless communication apparatus comprising:
a computer-readable memory constructed to store computer-executable instructions implementing process steps; and at least one processor constructed to execute the computer-executable instructions stored in the memory,
wherein the process steps implemented by the instructions stored in the memory comprise:
detecting a radar signal; and
switching to direct communication with another communication apparatus based on communication setting information for performing direct communication not via a base station between the wireless communication apparatus and the other communication apparatus, which is shared with the other communication apparatus, in the case where a radar signal is detected during communication with the other communication apparatus via the base station.

13. The apparatus according to claim 12,
wherein the communication setting information is shared in the case where a frequency channel used for communication with the other communication apparatus via the base station is a frequency channel used for transmission of a radar signal.

14. The apparatus according to claim 12, wherein the process steps further comprise determining whether or not the base station has a function of changing the frequency channel upon receipt of a radar signal, and
wherein switching to direct communication with the other communication apparatus is performed in the case where it is determined that the base station does not have the function of changing the frequency channel upon receipt of a radar signal.

15. The apparatus according to claim 12, wherein the process steps further comprise determining whether or not the base station has created a network on another frequency channel in the case where a radar signal is detected, and
wherein switching to direct communication with the other communication apparatus is performed in the case where it is determined that the base station has not created a network on another communication channel.

16. The apparatus according to claim 12, wherein the communication setting information contains an identifier of a network on which the direct communication is performed.

17. The apparatus according to claim 16, wherein the communication setting information further contains a frequency channel that is used during the direct communication.

18. The apparatus according to claim 16, wherein the communication setting information further contains information that indicates a creator or a joiner of the network on which the direct communication is performed.

19. The apparatus according to claim 12, wherein the process steps further comprise notifying the other communication apparatus of the detection of a radar signal in the case where a radar signal has been detected.

20. The apparatus according to claim 12, wherein switching to direct communication with the other communication apparatus is performed by changing the communication mode from an infrastructure mode to an ad hoc mode.

21. A non-transitory computer-readable recording medium on which are recorded computer-executable instructions for causing a computer to function as the wireless communication apparatus according to claim 12.

22. A communication method for a wireless communication apparatus, the method comprising:
detecting a radar signal; and
switching to direct communication with another communication apparatus based on communication setting information for performing direct communication not via a base station between the wireless communication apparatus and the other communication apparatus, which is shared with the other communication apparatus, in the case where a radar signal is detected during communication with the other communication apparatus via the base station.

* * * * *